United States Patent [19]

Valyi

[11] 4,305,772
[45] Dec. 15, 1981

[54] METHOD FOR FORMING AN INTERLOCKED ASSEMBLY

[76] Inventor: Emery I. Valyi, 5200 Sycamore Ave., Riverdale, N.Y. 10471

[21] Appl. No.: 113,776

[22] Filed: Jan. 21, 1980

Related U.S. Application Data

[60] Continuation-in-part of Ser. No. 5,959, Jan. 24, 1979, abandoned, which is a division of Ser. No. 911,359, Jun. 1, 1978, Pat. No. 4,207,134.

[51] Int. Cl.³ .................... B29C 17/00; B23P 11/02
[52] U.S. Cl. ................................ 156/287; 29/235;
29/773; 29/453; 156/294; 156/295; 156/423; 215/1 C
[58] Field of Search ............... 29/453, 773, 235; 215/1 C; 156/423, 295, 293, 294, 285, 287; 425/534

[56] References Cited

U.S. PATENT DOCUMENTS

| | | | |
|---|---|---|---|
| 3,244,574 | 4/1966 | Decker et al. | 156/423 X |
| 3,722,725 | 3/1973 | Khetani et al. | 215/1 C |
| 3,819,314 | 6/1974 | Marcus | 425/534 |
| 3,879,252 | 4/1975 | Vossen | 156/423 |
| 3,948,404 | 4/1976 | Collins et al. | 215/1 C |
| 3,966,378 | 6/1976 | Valyi | 425/530 X |
| 4,011,122 | 3/1977 | Ashcroft | 156/294 X |
| 4,082,200 | 4/1978 | Guest et al. | 29/453 X |
| 4,148,675 | 4/1979 | Ratte et al. | 156/294 X |
| 4,177,546 | 12/1979 | Geisinger | 29/235 |
| 4,236,305 | 12/1980 | Hetherington et al. | 29/453 X |

Primary Examiner—Charlie T. Moon
Attorney, Agent, or Firm—Bachman and LaPointe

[57] ABSTRACT

Method of forming an interlocked assembly of a base cup and a hollow plastic article including the steps of providing a groove in the side wall of either the article or cup engageable with a protrusion in the side wall of the other of said article or cup, internally pressurizing the article to harden same and outwardly expand the side walls, and forming an interlocked assembly by placing the base cup on the article to deform the side walls of the base cup by the hardened article and snap the groove and protrusion together.

8 Claims, 8 Drawing Figures

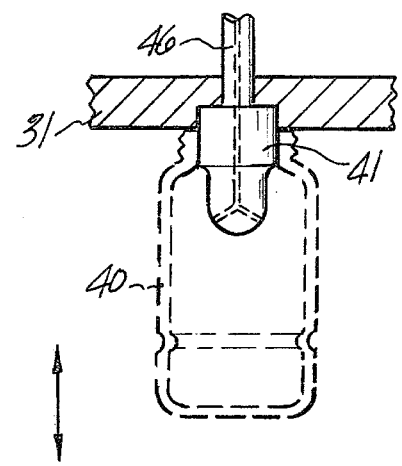
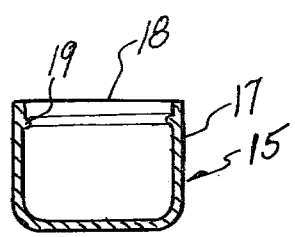
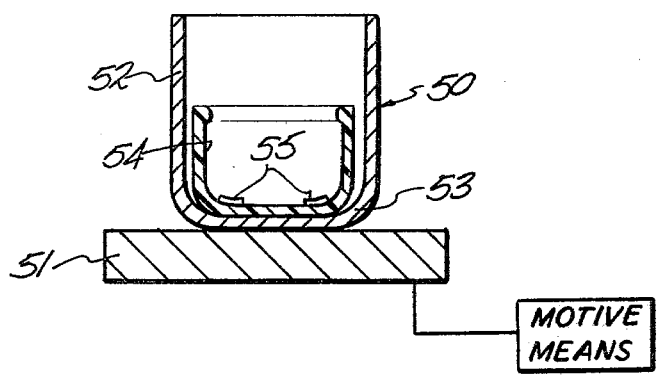
FIG-8   FIG-4
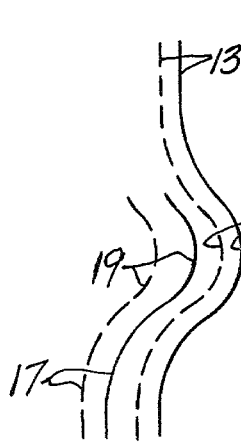
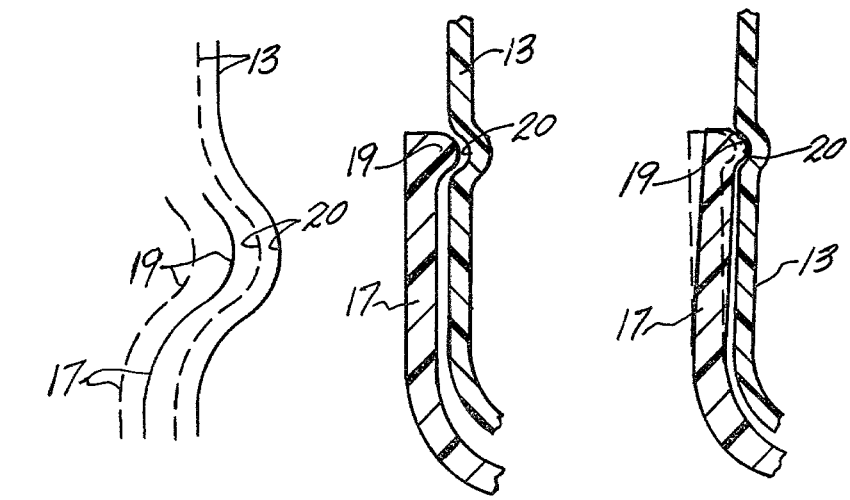
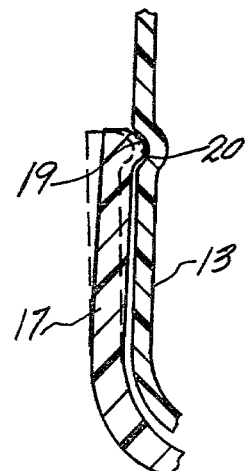
FIG-5   FIG-6   FIG-7

METHOD FOR FORMING AN INTERLOCKED ASSEMBLY

CROSS-REFERENCE TO RELATED APPLICATIONS

This application is a Continuation-In-Part of U.S. patent application Ser. No. 5,959, filed Jan. 24, 1979, now abandoned, which in turn is a Divisional of U.S. patent application Ser. No. 911,359, filed June 1, 1978, now U.S. Pat. No. 4,207,134, issued June 10, 1980.

BACKGROUND OF THE INVENTION

Bottles or containers having a base cup applied to the bottom thereof have gained widespread commercial application, especially plastic containers having a separate cup shaped base assembled on the bottom thereof to provide stability to the container so that the container can stand upright. For example, typical bottle-base cup assemblies are shown in U.S. Pat. Nos. 3,722,725, 3,726,429, 4,082,200 and 3,948,404.

Application of the base cup to the bottle includes the use of adhesive inside the base cup to insure a firm connection between the components. This naturally involves additional cost and a separate step which adds to the complexity of the operation.

The application of the base cup to the bottle takes place in a separate assembly step which naturally involves an additional procedure with attendant production delays. The base cup may be applied to the bottle at a separate location after the bottle has been prepared. This may involve transporting the bottles to the separate location with consequent considerable time delays. Alternatively, a separate base cup application station may be provided adjacent the bottle preparation apparatus; however, this may add considerable bulk to the overall apparatus and interfere with the smooth operation of said apparatus.

It is, therefore, a principal object of the present invention to provide a method for assembling base cups in a smooth and expeditious manner.

It is a further object of the present invention to provide such a method which forms a firmly interlocked assembly so that, if desired, one may dispense with the need for adhesive inside the base cup.

It is a further object of the present invention to provide a method as aforesaid which may be fully integrated with the rapid operating cycle in a bottle preparation apparatus.

Further objects and advantages of the present invention will appear hereinbelow.

SUMMARY OF THE INVENTION

In accordance with the method of the present invention it has now been found that the foregoing objects and advantages may be readily obtained. The method of the present invention forms an interlocked assembly of a base cup and a hollow plastic article and comprises: providing a hollow plastic article having a base portion, integral side walls and an integral open neck or rim portion; providing a hollow base cup for said article engageable therewith, said cup having a base portion, integral side walls substantially shorter than said article side walls and an integral open neck; providing a groove, preferably continuous, in the side wall of one of said article or cup engageable with a protrusion, preferably continuous, in the side wall of the other of said article or cup; internally pressurizing the article to harden same and outwardly expand the side walls; placing the base cup on the article to deform the side walls of the base cup by the hardened article and snap the groove and protrusion together; and releasing the internal pressure, whereby an interlocked assembly is formed when said article is pressurized or unpressurized.

In view of the fact that an interlocked assembly is formed when the bottle is pressurized or unpressurized, use of a separate adhesive in the base is optional. Naturally, the outward expansion of the bottle walls when the groove is in the bottle (which is the preferred embodiment) decreases the groove dimensions. However, the groove is formed so that sufficient depth is provided even when the bottle is pressurized so that a good connection is formed under either condition. Naturally, also, the hardened, pressurized bottle readily deforms the walls of the base cup so that a good fit may be achieved. This is particularly advantageous since the pressurized condition is the one that prevails when the bottle is filled.

The method of the present invention may be readily integrated with an apparatus for the preparation of the bottles containing one or more stations in a rapid operating cycle, even if a plurality of bottles are simultaneously prepared by said apparatus.

Further features of the method of the present invention will appear from the ensuing discussion.

BRIEF DESCRIPTION OF THE DRAWINGS

FIG. 4 is a partial view similar to FIG. 3 showing details of the cup application.

FIGS. 5, 6 and 7 are schematic partial sectional views showing the interlocking groove and protrusion relationship.

FIG. 8 is a cross-sectional view illustrating an alternate embodiment of base cup.

DETAILED DESCRIPTION

Figure 1:
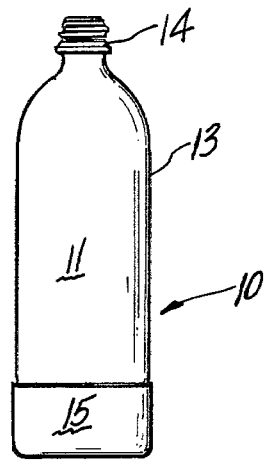
FIG. 1 shows an assembled bottle and cup prepared in accordance with the method of the present invention.
Figure 2:
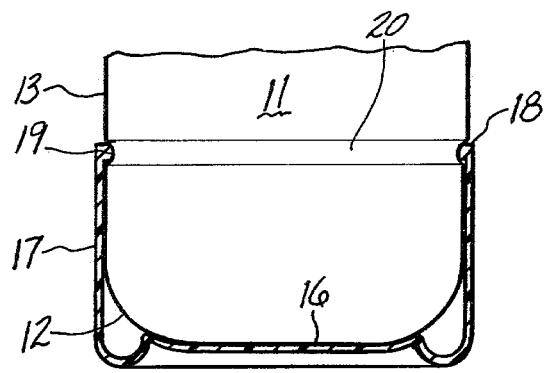
FIG. 2 is a partial cross-sectional view illustrating the details of the bottle bottom and the support base.

The method of the present invention conveniently and expeditiously forms an interlocked assembly 10 shown in FIGS. 1 and 2 having a base cup integrally applied to the bottom of article or bottle. The bottle 11 is a hollow plastic article having a bottom or base portion 12, integral side walls 13 and an integral open neck or rim portion 14 which is preferably constricted and threaded as shown. The base cup 15 is also hollow and engageable with the bottle. Cup 15 has a bottom or base portion 16, integral side walls 17 substantially shorter than the bottle and an integral open neck 18. In the formation of bottles and similar containers from thermoplastic materials especially in blow molding operations it is desirable to provide a rigid integral base cup to enable the container to stand upright in a relatively stable condition and to provide protection for the bottom of the container. This is especially true of biaxially oriented polyethylene terephthalate (PET) bottles having a concave pressure bottom designed to hold liquids under pressure as shown in FIG. 2, such as carbonated beverages.

In order to interlock the base cup and bottle, a preferably continuous groove is provided in the side wall of one of the article or cup engageable with a preferably continuous protrusion in the side wall of the other of said article or cup. Generally, the groove is in the article and the protrusion is in the inside of the base cup. Thus, as shown in FIG. 2, protrusion 19 on the inside surface of base cup side wall 17 adjacent side wall neck or rim 18 engages and mates with bottle groove 20 in bottle side wall 13. In the alternate embodiment of FIG. 8, protrusion 19 is located adjacent but slightly below rim 18.

This "snap-lock" type arrangement has been suggested heretofore, as for example, in U.S. Pat. No. 3,948,404. It has been found, however, that the snap-lock arrangement is not by itself sufficient to prevent separation of the base cup from the bottle so that an adhesive is normally used in the bottom of the base cup to prevent such separation. Experience has shown that in the absence of such adhesive the base cup slips off as pressure in the bottle builds up due to filling the bottle and often due to bottle storage at relatively high ambient temperatures. What actually happens in practice is that under internal bottle pressure, bottle side wall and base bulging does not stop, but rather the bottle base and side wall keep pushing outwardly while groove 20 keeps flattening out until the base cup is loose and ready to fall away.

It would, naturally, be highly desirable to be able to dispense with the extra expense and extra step of adhesive application. The method of the present invention enables one to dispense with the adhesive, if desired, and still obtain an interlocked assembly either under conditions of internal bottle pressure or absence of internal bottle pressure.

Thus, in accordance with the method of the present invention the interference fit between the protrusion and the groove is designed so that the base cup is applied to the bottle in the pressurized state. Prior to application of the base cup the bottle is internally pressurized to harden same and to outwardly expand the side walls. The dimensions of the groove are such, however, that sufficient depth is provided to maintain a well-defined groove with or without internal bottle pressure. The base cup is then placed on the bottle in the pressurized condition which outwardly deforms the side walls of the cup by the hardened article and snaps the groove and protrusion together. The internal bottle pressure is then released and an interlocked assembly formed whether or not internal bottle pressure exists.

The groove-protrusion relationship can be clearly shown by reference to schematic FIGS. 5, 6 and 7. FIG. 5 shows the bottle side wall 13 before (solid lines) and after (dotted lines) application of internal pressure. It can be seen that groove 20 straightens out upon application of pressure to a degree, but not so that the groove is completely obliterated. Corresponding base cup side wall 17 is schematically shown before (solid lines) and after (dotted lines) application of internal bottle pressure so that the base cup protrusion 19 can be seen to be pushed away by the application of internal bottle pressure.

Due to the application of pressure, the bottle becomes hard and capable of transmitting substantial forces. FIG. 6 shows the final protrusion-groove assembly and FIG. 7 shows the protrusion-groove assembly wherein the solid lines indicate the condition "at rest", while the dotted lines show the lip pushed to the outside under the influence of internal bottle pressure.

Given the above elements, the bottle is pressurized and pushed forcefully into the base cup (or the base cup pushed forcefully onto the bottle, or both components forced onto each other), whereby the base cup is deformed as shown in dotted in FIG. 7 until protrusion 19 snaps into groove 20. If the bottle were not pressurized, application of a tight base cup might deform or crumble the bottle. Also, as discussed above, subsequent pressurization might obliterate the groove.

Upon completion of the assembly, the bottle is decompressed and therefore springs back to the condition shown in solid lines in FIG. 5. At the same time, the cup will tend to revert to the condition shown in solid lines in FIG. 7. Thus, while the assembly may become somewhat looser, sufficient interference will remain to keep bottle and cup together. This condition will prevail only until the bottle is filled, at which time the tight fit is restored.

The present invention provides a convenient, effective and expeditious method for assembling bottles and base cups which may be integrated into an apparatus for the preparation of the bottles themselves. Biaxially oriented bottles of the type used in the present invention, such as PET bottles, may be readily prepared from preforms or parisons using blow molding techniques well known in the art. Preferred methods and devices for the preparation of such blow molded containers used in conjuction with the present invention are my U.S. Pat. Nos. 3,966,378, 4,151,248 and 4,174,934 and my parent U.S. patent application Ser. No. 911,359, filed June 1, 1978, the disclosures of which are incorporated herein by reference. Thus, the method of the present invention is preferably employed in conjunction with the ejection stage of my aforesaid prior patents and application as will be described in more detail hereinbelow.

Figure 3:
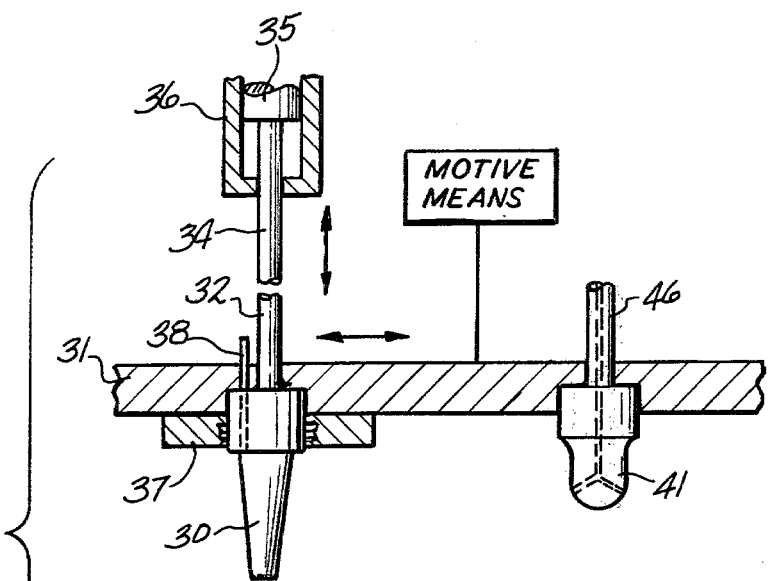
FIG. 3 is a partial elevation, partly in section, illustrating the method of the present invention in conjunction with an apparatus for the preparation of bottles.
Figure 3:
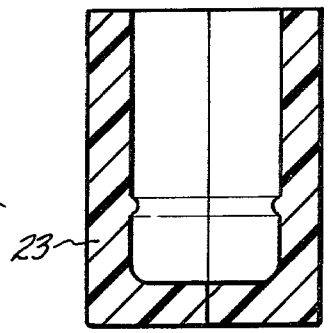
Figure 3:
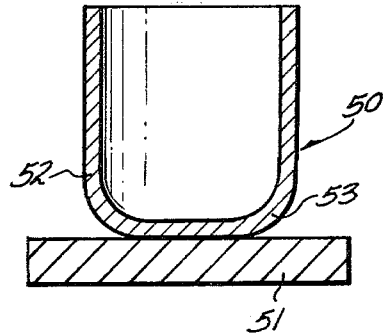

As shown in FIG. 3, core 30 on which a parison is provided is carried by platen 31 and is provided in spaced relationship with and aligned with blow mold 23. Whenever axial stretching of the parison is desired, core 30 will include a stretch and blow assembly which comprises a mandrel extension 32 which is reciprocable as indicated by the arrow in FIG. 3 to axially extend the parison on core 30. An actuating mechanism is shown which comprises a push rod 34 which engages extension 32, and which is connected to a piston 35 housed within a cylinder 36 which may, for example, be responsive to hydraulic pressure exerted by a pump, not shown. By controlling the flow of fluid into cylinder 36, the speed of piston 35 and therefore of a movable portion of core 30 may be controlled to stretch the parison at the speed best suited for the temperature of the parison. Naturally, other types of actuating mechanisms may be used. If a highly oriented article is not desired, the axial extension operation may be dispensed with.

Thus a parison (not shown) is provided on core 30 by any desired means, such as for example from a tempering mold as shown in the aforesaid parent application Ser. No. 911,359, and held thereon as at the neck region and, at times, also on a neck mold 37. In the absence of a neck mold one may, for example, retain the parison on core 30 by close fit of core 30 within the neck of the parison. A fluid passageway 38 is provided in conjunction with core 30 and terminates at the end surface of that portion of core 30 which does not move during movement of extension 32. Fluid passageway 38 also connects to a source of fluid pressure, not shown. Accordingly, fluid may enter the space inside the parison during final expansion to form the hollow article.

The parison on core 30 is then placed in blow mold 23 by axial or downward movement of platen 31 by any desired motive means and final orientation and expansion takes place to form the final article 40 (FIG. 4). As can be seen in FIGS. 3 and 4, an ejection device is provided in conjunction with core 30. The ejection device may be in the form of a core or article removal plug 41 for removing the finished article. Preferably, plug 41 is in integral, lateral spaced relationship to core 30 and is also carried on platen 31. Therefore, when the assembly is shifted sidewardly to the left (as by any desired motive means such as that shown schematically in FIG. 3) so that core 30 is engaging a parison in a tempering mold (not shown) situated laterally of the blow mold 23, the removal plug 41 engages the finished article 40 in the blow mold. As shown by the arrows, core 30 and plug 41 are axially and laterally reciprocable so that core 30 transfers the parison from the tempering mold to the blow mold 23 by a combination of axial, lateral and axial movements. Simultaneously, plug 41 removes finished article 40 from mold 23, which may be split to facilitate the extraction of the finished article, and applies the base cup thereon at the base cup application station located laterally of mold 23, by similar axial, lateral and axial movements. Naturally, if the bottle preparation apparatus prepares a plurality of bottles simultaneously, a plurality of associated base cup application stations are provided. Thus it can be seen that it is a significant advantage of the present invention that the base cup application procedure may be readily integrated into an apparatus for the preparation of the bottles themselves without interfering with the cycle of the bottle preparation apparatus.

As shown in FIG. 4, a base cup applicator is preferably provided for applying the base cup to the base of the finished article, with the applicator being located in lateral spaced relationship to mold 23 so that when core 30 and the parison engage mold 23, the applicator carrying a base cup engages the base of the finished article on the removal plug. Base cup applicator 50 is carried by a suitable platen 51 which may be movable in the direction of the arrow by a suitable motive means. The applicator includes a sleeve portion 52 and a bottom base cup carrier 53. In operation, carrier 53 is loaded with a base cup 54 by conventional means, not shown. The base cups may, if desired, be provided with adhesive 55 at predetermined, spaced locations to provide adhesion to the bottom of the finished article; however, as indicated hereinabove it is an advantage of the present invention that the adhesive may be dispensed with, if desired. The base cups carried by applicator 50 are then engaged with and applied to the base of the finished article 40, with sleeve 52 surrounding the finished article to aid in alignment and keep the bottle from buckling outwards. The base cup-bottle assembly has been described hereinabove. Air pressure is supplied inside the finished article by passageway 46 in core 41. Pressure is then applied in the direction of the arrow either to carrier 53 or platen 31 or both, pressing cup 54 firmly against the base of the bottle and forming the assembly as previously described. The applicator is removed from the finished article 40 (upon completion of requisite setting times if an adhesive is used) so equipped with a base cup 54, the article is stripped from plug 41, and the cycle repeated.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A method for forming an interlocked assembly of a base cup and a hollow plastic article which comprises: providing a hollow plastic article having a base portion, integral side wall, and an integral open neck or rim portion; providing a hollow base cup for said article engageable therewith, said cup having a base portion, integral side wall substantially shorter than said article side wall and an integral open neck; providing a groove in the side wall of one of said article or cup engageable with a protrusion in the side wall of the other of said article or cup; internally pressurizing said article to harden same and outwardly expand the side wall; placing the base cup on said article to deform the side wall of the base cup by the hardened article and snap said groove and protrusion together; and releasing the internal pressure, whereby an interlocked assembly is formed whether said article is pressurized or unpressurized.

2. A method according to claim 1 wherein said groove and protrusion are substantially continuous.

3. A method according to claim 2 wherein the groove is in the article and the protrusion is on the inside of the cup, and wherein said internal pressure reduces the dimension of the groove, and wherein said protrusion and groove are seated together with or without internal pressure.

4. A method according to claim 1 wherein adhesive is used inside the base cup.

5. A method according to claim 1 including the step of holding said article by an ejector means of an article preparation apparatus having pressure application means associated therewith for internally pressurizing said article.

6. A method according to claim 5 including the step of holding said base cup on a base cup applicator in lateral spaced relationship to said article preparation apparatus and relatively movable into and out of engagement with said article while said article is on said ejector means.

7. A method according to claim 5 including the step of preparing a second article on said article preparation apparatus while said base is being placed on the article.

8. A method according to claim 3 wherein said protrusion is located adjacent the base cup open neck.

* * * * *